United States Patent
Saarinen et al.

(10) Patent No.: US 8,190,493 B2
(45) Date of Patent: May 29, 2012

(54) SHOPPING CART SERVICE SYSTEM AND METHOD

(75) Inventors: Mark Saarinen, Minneapolis, MN (US); Amit Bartake, Eden Prairie, MN (US); Brad Livingston Armstrong, Minnetonka, MN (US); Deanne John Millington, Lakeville, MN (US); Eric Gunter Roubal, Eden Prairie, MN (US)

(73) Assignee: Digital River, Inc., Eden Prairie, MN (US)

( * ) Notice: Subject to any disclaimer, the term of this patent is extended or adjusted under 35 U.S.C. 154(b) by 0 days.

(21) Appl. No.: 11/694,925

(22) Filed: Mar. 30, 2007

(65) Prior Publication Data

US 2007/0233579 A1  Oct. 4, 2007

Related U.S. Application Data

(60) Provisional application No. 60/787,977, filed on Mar. 31, 2006.

(51) Int. Cl.
   *G06Q 30/00* (2006.01)
(52) U.S. Cl. .............. 705/26.8; 705/26.1; 705/26.61; 705/27.1
(58) Field of Classification Search .......... 705/26–27.2
   See application file for complete search history.

(56) References Cited

U.S. PATENT DOCUMENTS

| | | | |
|---|---|---|---|
| 5,889,863 A * | 3/1999 | Weber | 705/76 |
| 5,905,973 A | 5/1999 | Yonezawa et al. | |
| 6,850,917 B1 | 2/2005 | Hom et al. | |
| 6,868,393 B1 | 3/2005 | Demsky et al. | |
| 6,873,968 B2 | 3/2005 | Ehrlich et al. | |
| 6,925,444 B1 | 8/2005 | McCollum et al. | |
| 7,110,968 B2 | 9/2006 | Haynes et al. | |
| 7,155,714 B2 * | 12/2006 | Makris et al. | 717/176 |
| 7,188,081 B1 | 3/2007 | Shah | |
| 7,197,475 B1 * | 3/2007 | Lorenzen et al. | 705/26 |
| 2001/0054012 A1 | 12/2001 | Nayyar | |

(Continued)

FOREIGN PATENT DOCUMENTS

WO   WO0031657   *   6/2000

OTHER PUBLICATIONS

Harold, Elliotte Rusty, Processing XML with Java: A Guide to SAX, DOM, JDOM, JAXP, and TrAX, Nov. 5, 2002, Addison Wesley Professional, Chapter 1, paragraph 1.*

(Continued)

*Primary Examiner* — Will Allen
(74) *Attorney, Agent, or Firm* — Clise, Billion & Cyr, P.A.; Richard Billion

(57) ABSTRACT

In accordance with one embodiment of the invention, a set of web services is provided that allow a client application to display product information from a site catalog, add/update/delete those products into a shopping cart hosted on the client, and have that shopping cart also maintained at a central hosted site. As such, the user is directed to the central hosted site in order to complete payment and fulfillment of the order. Several companies desire this functionality. As such, a set of shopping cart application programming interface (API) can be built and used to access product information and prices as well as to add or remove products from the shopping cart to which the consumer will be redirected upon finalizing the purchase. These processes are conducted in real time.

20 Claims, 8 Drawing Sheets

U.S. PATENT DOCUMENTS

| | | | |
|---|---|---|---|
| 2002/0052806 | A1 | 5/2002 | Hodson et al. |
| 2002/0087430 | A1* | 7/2002 | Davis et al. .................. 705/26 |
| 2002/0133429 | A1 | 9/2002 | Lu |
| 2002/0143637 | A1 | 10/2002 | Shmueli et al. |
| 2002/0156685 | A1 | 10/2002 | Ehrlich et al. |
| 2002/0161661 | A1 | 10/2002 | Haynes et al. |
| 2002/0174034 | A1* | 11/2002 | Au et al. ...................... 705/27 |
| 2003/0014319 | A1 | 1/2003 | Arbab et al. |
| 2003/0018536 | A1 | 1/2003 | Eggebraaten et al. |
| 2003/0018545 | A1 | 1/2003 | Yonezawa et al. |
| 2003/0078991 | A1* | 4/2003 | Harris ........................ 709/218 |
| 2003/0093321 | A1 | 5/2003 | Bodmer et al. |
| 2003/0093323 | A1 | 5/2003 | Kenyon |
| 2003/0144914 | A1 | 7/2003 | Gossard et al. |
| 2004/0254855 | A1 | 12/2004 | Shah |
| 2005/0021417 | A1 | 1/2005 | Kassan |
| 2005/0086103 | A1 | 4/2005 | Agura et al. |
| 2005/0108104 | A1 | 5/2005 | Woo |
| 2005/0114228 | A1 | 5/2005 | Wadhwani |
| 2005/0131772 | A1 | 6/2005 | Chow et al. |
| 2005/0278231 | A1 | 12/2005 | Teeter |
| 2006/0015405 | A1 | 1/2006 | Bala et al. |
| 2006/0293970 | A1 | 12/2006 | Haynes et al. |
| 2007/0150360 | A1* | 6/2007 | Getz .............................. 705/26 |
| 2009/0271289 | A1* | 10/2009 | Klinger et al. ................. 705/26 |
| 2009/0307107 | A1* | 12/2009 | Gupta et al. ................... 705/26 |

OTHER PUBLICATIONS

Patton, Derek Franklin Brooks, Flash 5! Creative Web Animation, Dec. 22, 2000, Macromedia Press, Chapter 1, paragraph 1.*

DPS Announces Availability of DPS Flash Release 6.0; DPS Flash Now Supports Creation of CD-ROM Catalogs. Business Wire. New York: Jan 29, 2004. p. 1. [recovered from Proquest database on Nov. 10, 2009].*

* cited by examiner

SHOPPING CART SERVICE SYSTEM AND METHOD

This application claims the benefit of U.S. Provisional Application No. 60/787,977 filed 31 Mar. 2006, entitled "Shopping Cart Service," which is incorporated herein by reference.

FIELD OF THE INVENTION

The present invention relates to ecommerce systems on the internet. More particularly, the present invention relates to a system and related tools for providing integration and synchronization between one hosted shopping cart and the display of the same shopping cart on an external application such as a flash client.

BACKGROUND OF THE INVENTION

Since the dawn of the computer age, computer systems have evolved into extremely sophisticated devices, and computer systems may be found in many different settings. The widespread proliferation of computers prompted the development of computer networks that allows computers to communicate with each other. With the introduction of the personal computer (PC), computing became accessible to large numbers of people. Networks for personal computers were developed that allow individual users to communicate with each other.

One significant computer network that has recently become very popular is the Internet. The Internet grew out of this proliferation of computers and networks, and has evolved into a sophisticated worldwide network of computer system resources commonly known as the World Wide Web. A user at an individual PC (i.e., workstation) that wishes to access the Internet typically does so using a software application known as a web browser. A web browser makes a connection via the Internet to other computers known as web servers, and receives information from the web servers that is rendered to the user's workstation. Information transmitted from the web server to the web browser is generally formatted using a specialized language called Hypertext Markup Language (HTML) and is typically organized into pages known as web pages. Other Internet resources exist for transferring information, such as File Transfer Protocol (FTP) and Gopher, but have not achieved the popularity of the Web. In the Web environment, servers and clients effect data transfer using the Hypertext Transfer Protocol (HTTP), a known protocol for handling the transfer of various data files (e.g., text, still graphic images, audio, motion video, etc.). When capitalized, the term "Internet" refers to the collection of networks and gateways that use the TCP/IP suite or protocols.

It will be understood by one of ordinary skill in the art that the term "computer" or "computational device", as used herein, may refer to any of such device which contains a processor and some type of memory. The networks connecting computational devices may be "wired" networks, formed using lines such as copper wire or fiber optic cable, wireless networks employing earth and/or satellite-based wireless transmission links, or combinations of wired and wireless network portions. Many such networks may be organized using a client/server architecture, in which "server" computational devices manage resources, such as files, peripheral devices, or processing power, which may be requested by "client" computational devices. "Proxy servers" can act on behalf of other machines, such as either clients or servers.

On-line commerce is now an important part of our economy, mainly because of the efficiency and the ready convenience that on-line commerce, or e-commerce, provides. Furthermore, online merchants have discovered the value of selling their goods via the Internet. Many allow buyers to place goods in a virtual "shopping cart", and then when the buyer is prepared to finalize the purchase, they proceed to the "checkout." At this stage, all of the items in the buyer's shopping cart are displayed with their prices, tax, shipping and handling, and a total amount due is shown to the buyer. The buyer can then enter credit card information, and pressing a "submit" button sends the credit card information to the merchant, who then authenticates the credit card and receives an authorization for the sale. The term e-commerce is used herein to refer to any commercial activity using computers interconnected by a communication network, e.g., the Internet. Because of the unique characteristics of the Internet, carrying out commercial transactions over the Internet presents new issues and new opportunities.

Recognizing that buyers may not want to conclude their purchase immediately, merchants often allow the buyer to save his or her shopping cart for a predetermined period of time. The buyer may then retrieve the saved cart at some later time, after providing the merchant with proper identification. The saved cart may then be cancelled or changed at will. When the buyer is ready to conclude their purchase, he or she may proceed to check out, in the same manner described above.

The number of online shoppers who purchase something has steadily increased from approximately 3.5 percent in 2003 to over four percent in 2004. It has been estimated that between 25 and 78 percent of online shoppers abandon their online shopping carts before making purchases. This correlates to the estimate that for every dollar of revenue made from sales online, shopping cart abandonment results in nearly five dollars of lost revenue. Furthermore, some prior art shopping carts utilize back end systems to authorize and then charge buyers. This type of shopping cart sends product and customer data back to another service before approving and adding the item to the cart.

Thus a need exists to have a synchronized shopping cart service that solves the above mentioned problem. The present invention provides a solution to these needs and other problems, and offers other advantages over the prior art.

BRIEF SUMMARY OF THE INVENTION

The present invention is related to a software system that solves the above-mentioned problems. In accordance with one embodiment of the invention, a set of web services will be provided that allow the client application to display product information from a site catalog, add/update/delete those products into a shopping cart hosted on the client, and have that shopping cart also maintained at a central hosted site. As such, the user may be directed to the central hosted site in order to complete payment and fulfillment of the order. It is believed that several companies desire this functionality. As such, a set of shopping cart application programming interface (API) can be built and used to access product information and prices as well as to add or remove products from the shopping cart to which the consumer will be redirected upon finalizing the purchase.

Additional advantages and features of the invention will be set forth in part in the description which follows, and in part, will become apparent to those skilled in the art upon examination of the following or may be learned by practice of the invention.

DETAILED DESCRIPTION

Figure 1:
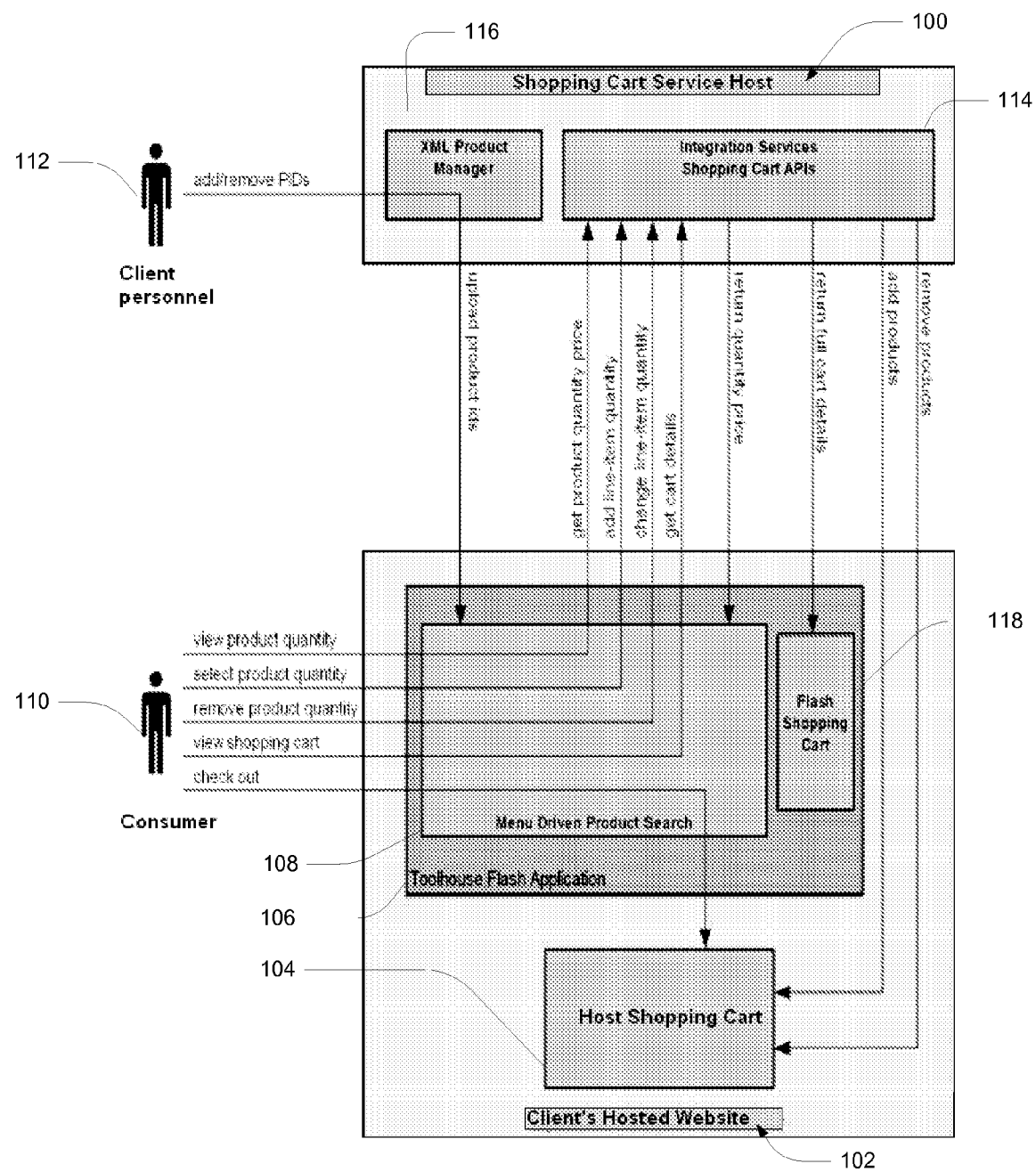
FIG. 1 describes an overview diagram of the shopping cart service system and method.

In a preferred embodiment of shopping cart service system and method, a set of web services will be provided that allow the client application to display product information from a site catalog. The web service will allow the client application to add, update, and delete products into a shopping cart hosted on the client application. The shopping cart will also be maintained at a central hosted site. As such, the user may be directed to the central hosted site in order to complete payment and fulfillment of the order. It is believed that several companies desire this functionality. As such, a set of shopping cart APIs can be built and used to access product information and prices as well as to add or remove products from the shopping cart to which the consumer will be redirected upon finalizing the purchase.

For example, say a user is playing a simulation and strategy video game and wants to acquire a new pair of jeans for one of the "virtual people" in the game. The user may then purchase the jeans from a shopping cart incorporated into the video game menu screen. A video game shopping cart may be a flash application that allows the user to choose and purchase items within the video game. The video game shopping cart continually synchronizes with the shopping cart service system, thereby omitting the need to remotely send data or wait for authorization.

Furthermore, the shopping cart service system and method allows third party applications or any other process desiring this functionality to retrieve product information and manage a shopping cart. More specifically, the features provide the ability to retrieve a list of products matching desired search criteria, such as a product identification (ID) or external reference ID. The third party applications or other process desiring functionality will be able to add new items to a shopping cart and modify quantities for items already existing in a shopping cart. The user will also be able to delete items from the cart, setting the quantity to zero.

In a preferred embodiment of shopping cart service system and method, the service is implemented as a job existing in an integration framework by extending a RealtimeJobImpl class. This provides the shopping cart service with all the functionality provided by the integration framework such as logging, retry, and transports.

In another preferred embodiment, shopping cart system and method works with an electronic commerce (e-commerce) platform to provide third-party applications with an interface for retrieving products, variations and quantity based pricing. Furthermore, the interface allows for adding a quantity of a product to the shopping cart that will retrieve full content of the real-time shopping cart to the third-party application.

In addition, the client application may post standard canonical xml to an integration servlet. Conversely, the client can post data in an alternative format, which will require integration services work to define a translator to map the client format into the canonical XML. Each request posted to the shopping cart service should contain XML as its body and will be processed with an XML response returned. The definitions of the XML request and corresponding responses are described further below.

The shopping cart service needs to ensure that repeated requests from a buyer operate on the correct user session and requisition. Authentication may occur by first returning a session token attribute. The value for this attribute will be an encrypted user session ID. Next, all requests to the shopping cart service can optionally pass in a session token attribute. Users of the shopping cart service can maintain session continuity by re-sending the session token received from previous responses. The logic for setting the value for session token upon processing a request is as follows:

If received for a value for session token, find its matching valid user session. If found, no change.

If no value received for session token, check an HTTP Requests visitor cookie. If found, attempt to match to the valid user session.

If no valid user session found, create a new user session and return its encrypted user session ID.

The logic for determining the requisition to sue is as follows:

Requests for retrieving the shopping cart or adding/updating a cart can optionally send a requisition ID.

If requisition ID is received, use it if it is still in an open state and is owned by the user found in the user session. If requisition ID is satisfied, make it the current requisition for the user session.

If no requisition ID received or received requisition ID is invalid, get the current requisition from the user session, creating a new requisition if necessary.

If received requisition ID is invalid, an error code will be returned indicating that the ID is invalid. No further processing will occur.

Before moving on to a description of the figures, Table 1 is shown. Specifically, Table 1 describes concrete classes that are part of a code base for shopping cart service system and method. It will be understood by one of ordinary skill in the art that these concrete classes apply to FIGS. 1-8. The corresponding description for each concrete class is also shown.

TABLE 1

| Class | Description |
|---|---|
| ShoppingCartServiceJobImpl 126 | Responsible for processing all requests posted to the Shopping Cart Service |

TABLE 1-continued

| Class | Description |
| --- | --- |
| SearchProductHandler 130 | Helper for product search requests |
| AddUpdateShoppingCartHandler 132 | Helper for adding to and updating shopping cart |
| GetShoppingCartHandler 134 | Helper for retrieving shopping cart |
| BaseShoppingCartServiceRequest 136 | Base class for all requests to the Shopping Cart Service. Contains standard request attributes: siteID, locale, applicationName |
| SessionToken 138 | Superclass for all requests and base class of all responses from the Shopping Cart Service. Manages the session ID sent to and returned from the Shopping Cart Service. Returns an encrypted Pacific user session ID |
| SearchProductRequest 140 | A request received by the Shopping Cart Service for fetching products. Can search for multiple products using received product keys. Optionally searches by catalog and category. May limit number of rows returned and can exclude variations. Request can also specify which base attributes and extended attributes should be returned |
| SearchProductResponse 142 | The response returned for a SearchProductRequest. May return one or more product matches for the request. Returned product information includes any specified attributes and price information |
| ProductSearchCriteria 144 | In the ProductSearchRequest, encapsulates the details for the search criteria |
| ProductSearchOptions 146 | In the ProductSearchRequest, encapsulates details for how the search results should be returned |
| ProductInfo 148 | Main container object representing a product in Shopping Cart Service responses |
| ProductBaseFields 150 | Represents a product's base attributes |
| ProductPricingInfo 152 | The pricing attributes of a product. Includes quantity, unit prices both with and without incentives, and total price with and without incentives |
| AddUpdateShoppingCartRequest 154 | A request received by the Shopping Cart Service for adding new items to the shopping cart or updating existing line items |
| AddUpdateShoppingCartResponse 174 | The response returned for an AddUpdateShoppingCartRequest. Returns the contents of the shopping cart. Uses existing shopping cart matching received session or requisitionID or returns new shopping cart if one does not exist or requested cart is invalid |
| GetShoppingCartRequest 176 | A request received by the Shopping Cart Service for retrieving the shopping cart. |
| GetShoppingCartResponse 178 | The response returned for a GetShoppingCartRequest. Returns the contents of the shopping cart. Uses existing shopping cart matching received session or requisitionID or returns new shopping cart if one does not exist or requested cart is invalid. |
| ShoppingCartDisplayOptions 156 | For requests that interact with shopping cart, allows specifying any product base attributes and extended attributes to return within the response |
| ShoppinCartLineItemInfo 158 | Holds the information for a request to add or update a specific line item |
| ShoppingCartLineItemDetailedInfo 160 | Holds the information for a response representing a specific line item in the shopping cart |
| ProductKey 162 | For both requests and responses, contains the compound data the uniquely identifies the product: productID, externalReferenceID, companyID, and locale. Request may contain only a subset of this data |
| CatalogKey 164 | Contains optional parameters used during product search requests for returning products that exist in a specific catalog. If values for CatalogKey do not get set, service will search for products in the site's default catalog. |
| CategoryKey 166 | Contains optional parameters used during product search requests for returning products that exist in a specific catalog category |
| RequisitionLineItemKey 168 | Used for uniquely identifying line items within a shopping cart |

TABLE 1-continued

| Class | Description |
|---|---|
| ExtendedAttributesInfo 170 | Contains name/value pairs and data types for any returned product extended attributes. Will only return attribute value for a given attribute if viewable flag for the attribute is set to true |
| MoneyInfo 172 | Represents the currency and amount for any returned prices |

FIG. 1 describes a diagram for the shopping cart service system and method. The diagram describes an API use case. A shopping cart service host 100 is integrated with an XML product manager 116 and integration services shopping cart API 114. Client personnel 112 may add or remove product IDs from the XML product manager 116, thereby uploading product IDs to a flash application 106. A client's hosted website 102 is integrated with a host shopping cart 104 and the flash application 106. The flash application 106 contains a menu driven product search 108 and a flash shopping cart 118. A consumer 110 may view product quantities, select product quantities, remove product quantities, view shopping cart, and also check out. For each of these actions, the flash application 106 and menu driven product search 108 synchronize product quantity prices, line-item quantities, and cart details with the integration services shopping cart API 114. For checkout, the menu driven product search 108 and flash application 106 loads the host shopping cart 104.

Figure 2:
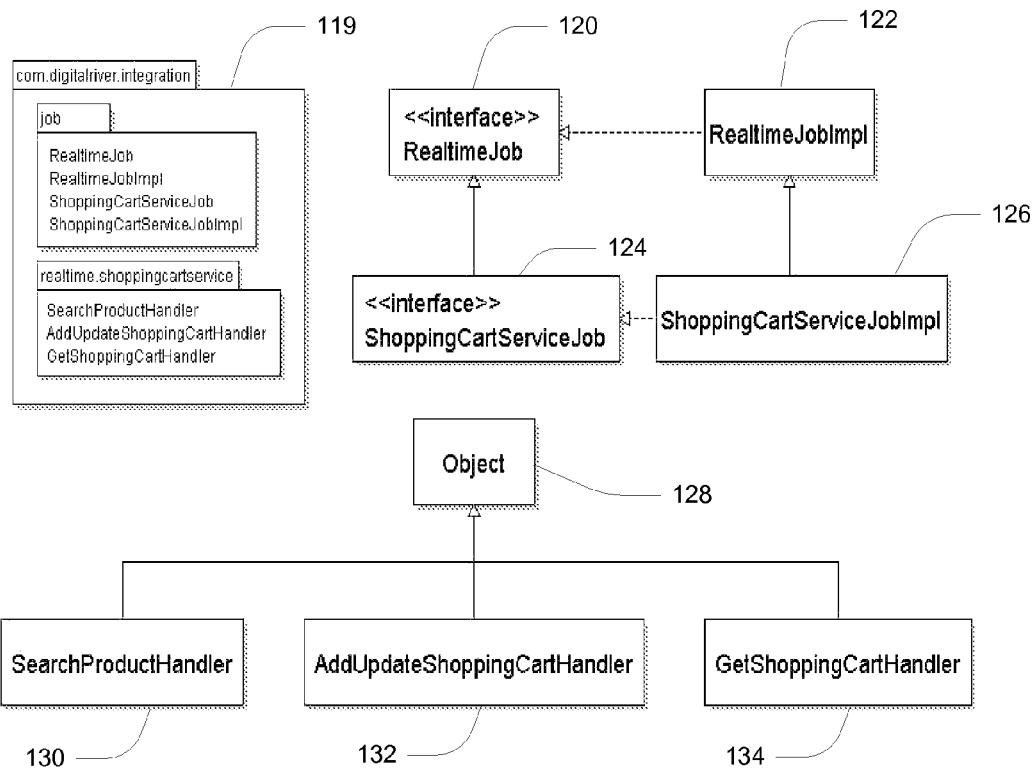
FIG. 2 describes a framework diagram of a backend view of shopping cart service system and method.

Referring now to FIG. 2, a framework diagram of a backend view of shopping cart service system and method is described. A framework for java packaging 119 is shown as well as a process between <<interface>>RealtimeJob 120, RealtimeJobImpl 122, <<interface>>ShoppingCartServiceJob 124, Object 128, and ShoppingCartServiceJobImpl 126. Also, SearchProductHandler 130, AddUpdateShoppingCartHandler 132, and GetShoppingCartHandler 134 de-serialize XML and form XML into objects. It will be understood that these correspond to requests and responses for shopping carts (shown and described in FIGS. 3-9). This is further outlined in Table 2, showing a request and the corresponding handler and response.

fields and product attributes, as well as pricing information. Only purchasable products will be returned in this response. If a productKey 162 is received that finds a base product that does not contain variations, the base product will be returned. If the productKey 162 is received that finds a base product that contains variations, its variations will be returned. If the productKey 162 is received that finds a variation, the variation will be returned.

Figure 5:
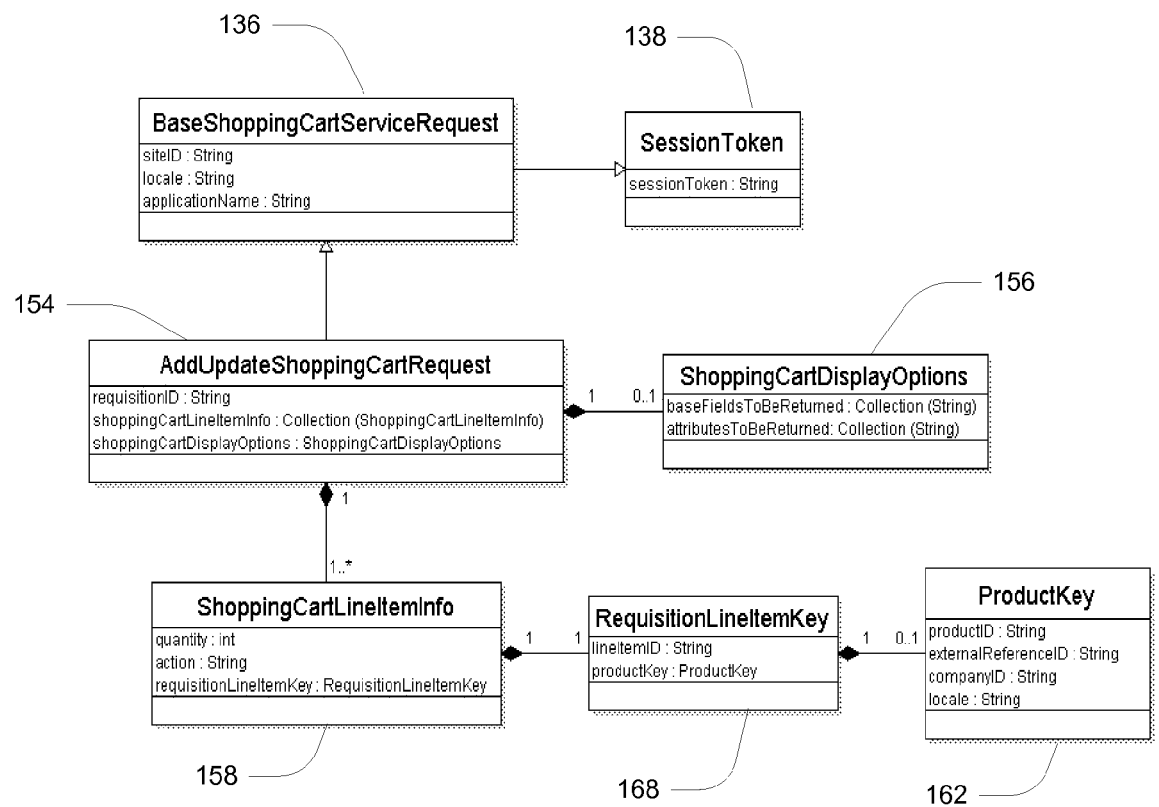
FIG. 5 describes a diagram for adding and updating a shopping cart request.

FIG. 5 describes a diagram for adding and updating a shopping cart request. An AddUpdateShoppingCartRequest 154 is for adding products to cart, modifying quantities for products that already exist in the cart, and deleting products from the cart. Multiple operations can be performed in a single request. The operation to be performed is determined by a value of a ShoppingCartLineItemInfo 158 action attribute, which is defined as follows: ADD adds the item to the shopping cart, UPDATE updates the quantity for an existing item if it is found; otherwise performs an add operation, and UPDATE with a quantity of zero or a negative value represents a delete item operation. Additionally, the request can define which base attributes and product attributes should be returned with the shopping cart response.

Figure 6:
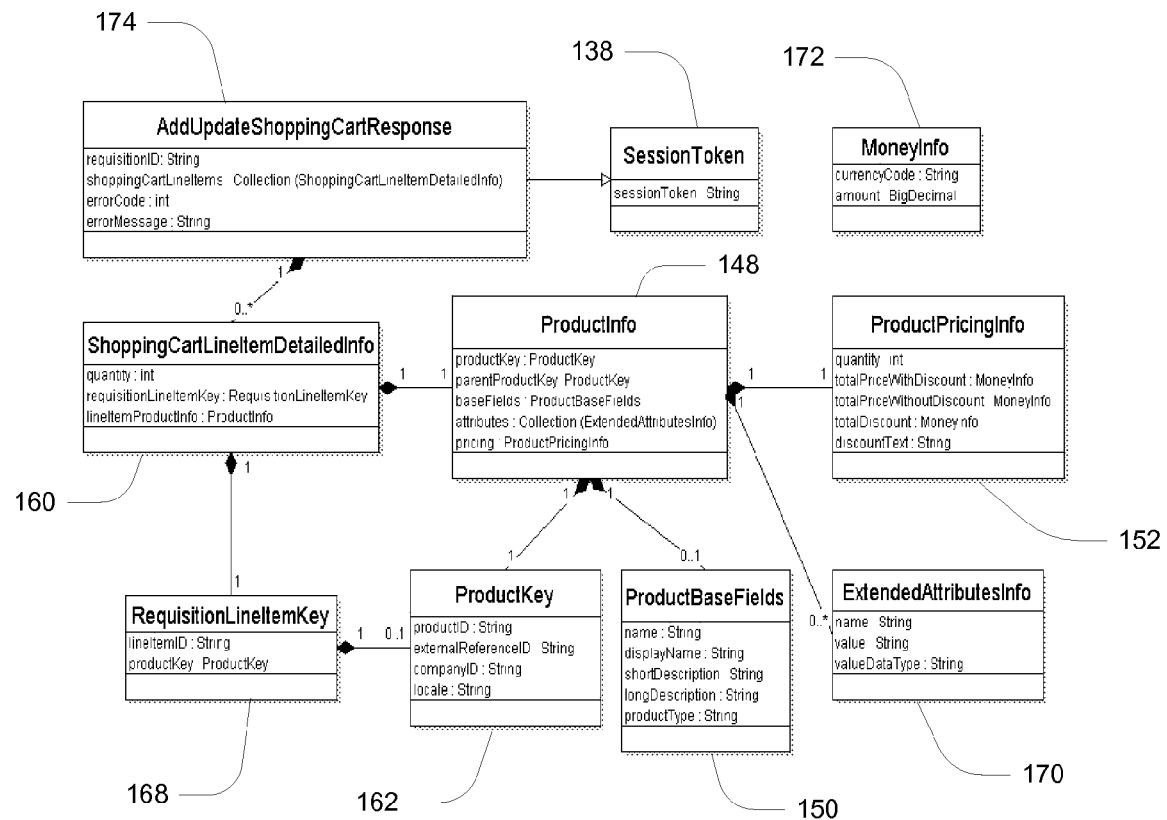
FIG. 6 illustrates a diagram for returning contents of a shopping cart.

FIG. 6 illustrates a diagram for returning contents of the shopping cart. An AddUpdateShoppingCartResponse 174 is returned for each BaseShoppingCartServiceRequest 136 (as shown in FIG. 5). It returns the entire contents of the shopping cart. Information returned includes any requested base fields and product attributes, as well as pricing information.

Figure 7:
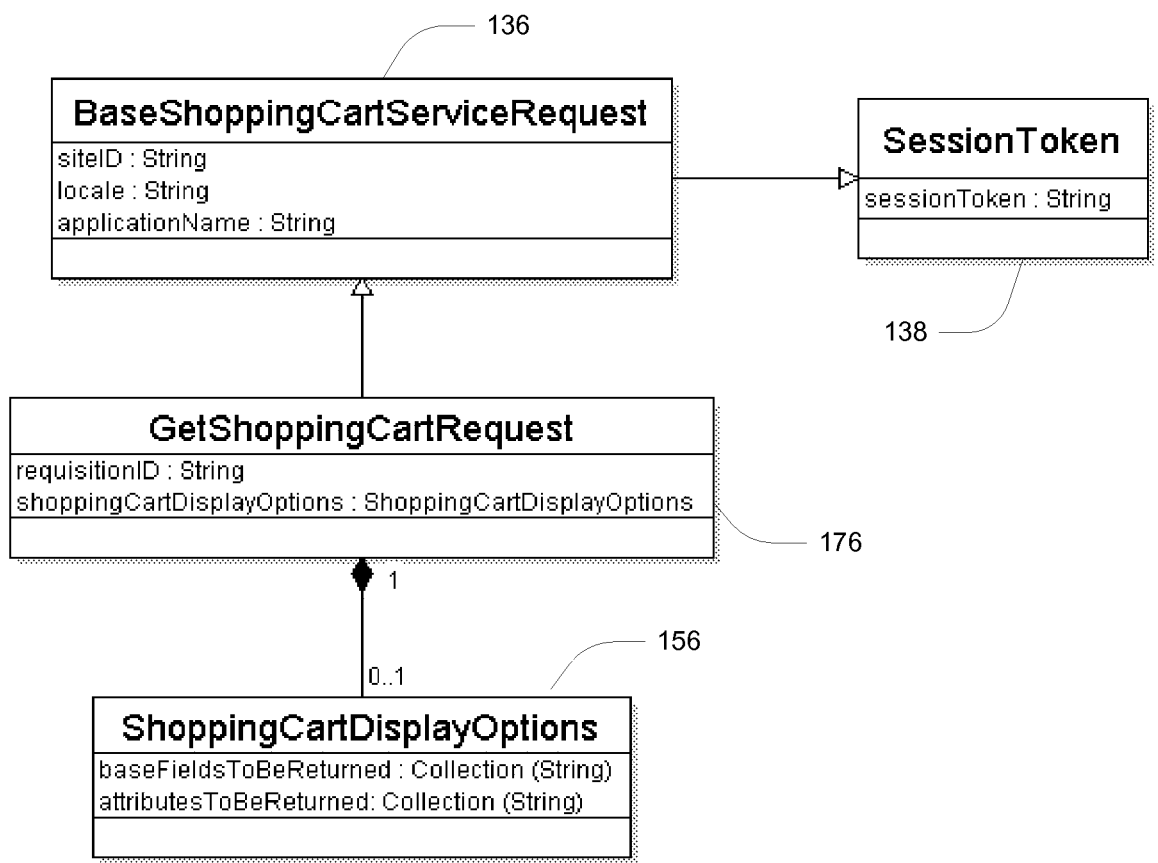
FIG. 7 illustrates a diagram for reclaiming a shopping cart.

Furthermore, FIG. 7 illustrates a diagram for reclaiming the shopping cart. GetShoppingCartRequest 176 retrieves the shopping cart. The request can define which base attributes and product attributes should be returned with the shopping

| Request | Handler | Response |
|---|---|---|
| SearchProductRequest 140 | SearchProductHandler 130 | SearchProductResponse 142 |
| AddUpdateShoppingCartRequest 154 | AddUpdateShoppingCartHandler 132 | AddUpdateShoppingCartResponse 174 |
| GetShoppingCartRequest 176 | GetShoppingCartHandler 134 | GetShoppingCartResponse 178 |

Figure 3:
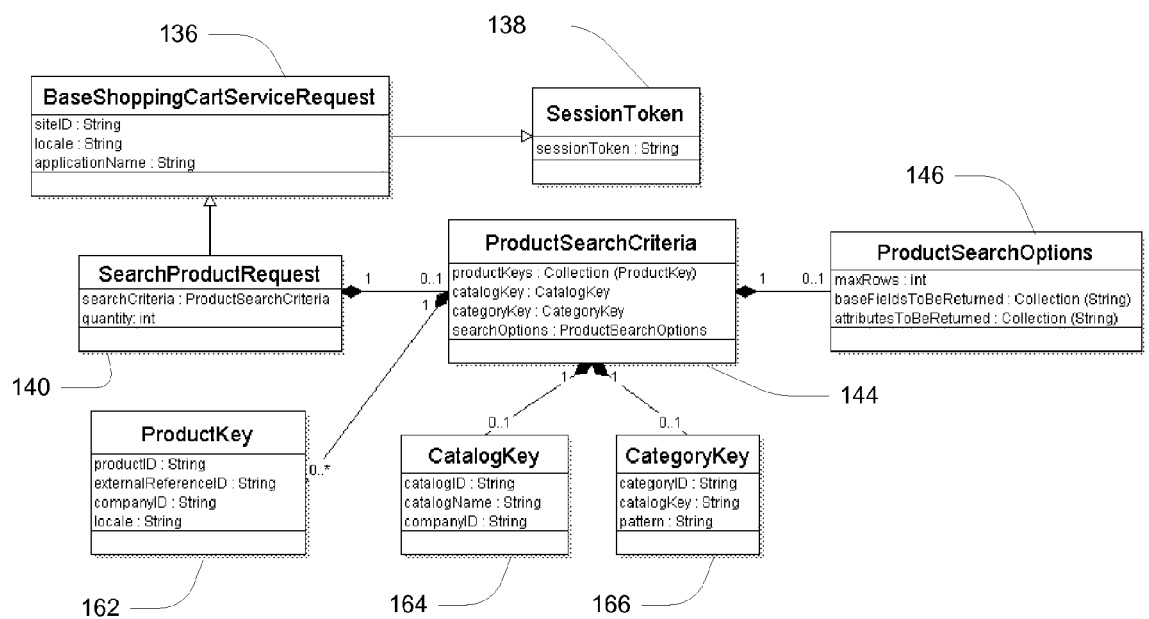
FIG. 3 shows a diagram for performing a search for one or more products.

FIG. 3 shows a diagram of performing a search for one or more products. A SearchProductRequest 140 is for performing a search to locate one or more products. The product search will typically be keyed by product ID or externalReferenceID and may also include catalogID or categoryID. Additionally, the consumer 110 can indicate base fields (e.g., "name", "shortDescription", "productType") and product attributes to be returned for each product (e.g., "platform") in the search result.

Figure 4:
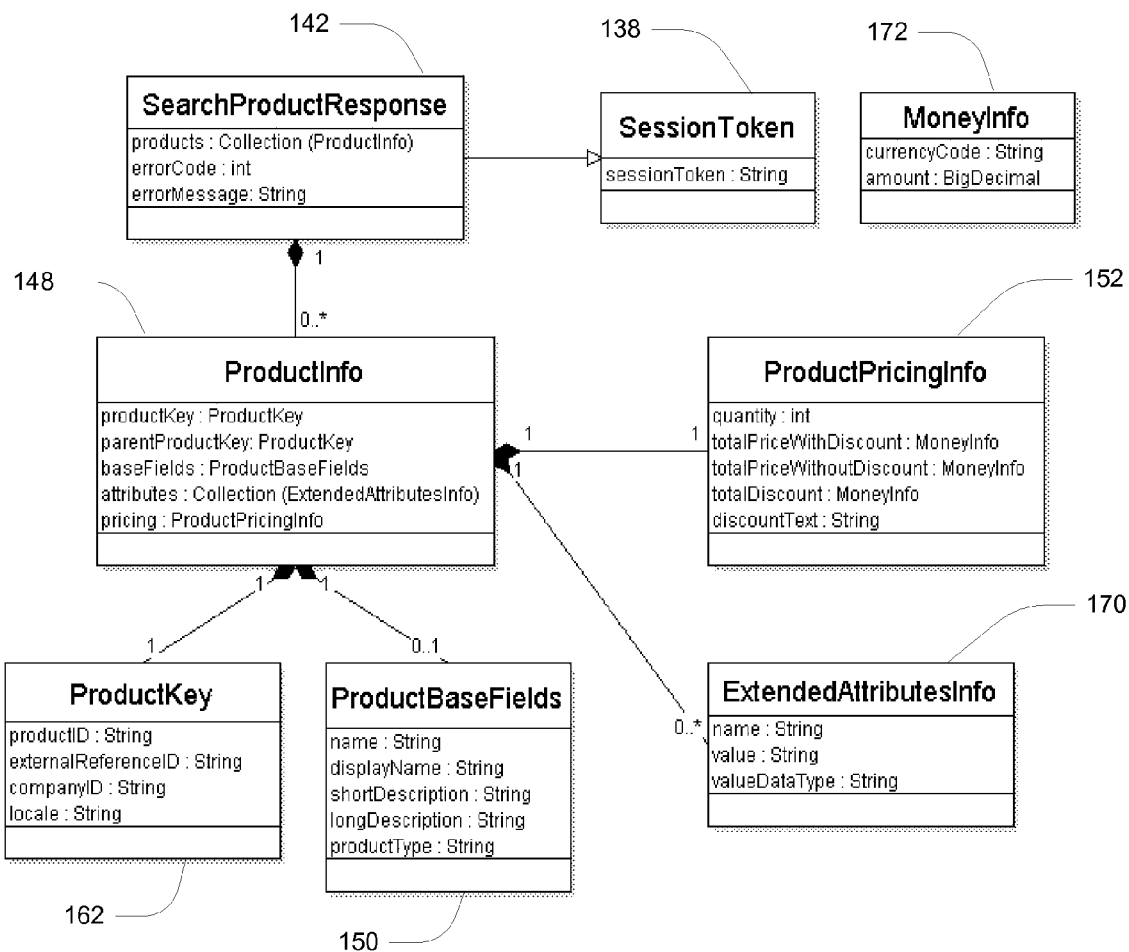
FIG. 4 describes a search product response diagram.
Figure 8:
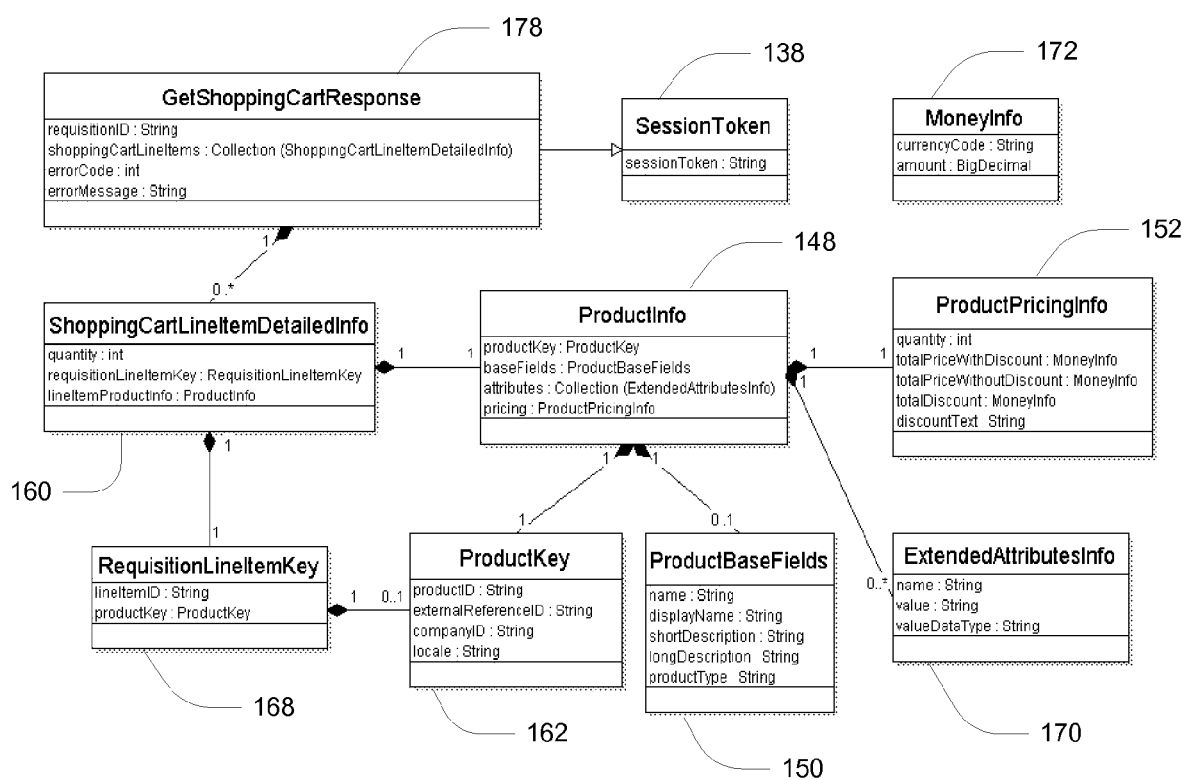
FIG. 8 illustrates a diagram for returning entire contents of a shopping cart.

Referring now to FIG. 4, a search product response diagram is shown. A SearchProductResponse 142 is returned for each SearchProductRequest 140. It returns the product details for each found product matching the search criteria of the request. Information returned includes any requested base cart response. Referring now to FIG. 8, a GetShoppingCartResponse 178 is returned for each GetShoppingCartRequest 176. It returns the entire contents of the shopping cart. Information returned includes any requested base fields and product attributes, as well as pricing information.

Use cases for the various embodiments of shopping cart system and method are shown below, in Tables 3-7. A user may utilize the shopping cart service system and method to view product details and tiered pricing, as described in Table 3. Table 4 shows the steps and requirements for adding products to the shopping cart, and Table 5 shows changing shopping cart product quantities. Table 6 shows a use case for viewing an existing cart, and Table 7 shows a use case for checking out.

Use Cases

TABLE 3

Viewing Product Details & Tiered Pricing

| Information | Details |
|---|---|
| Summary | Using a third-part application (TPA), a consumer is able to view product details and tiered pricing. The TPA will retrieve product details and pricing through a Get Products API. |
| Primary Actor(s) | Consumer; TPA; Get Products API |
| Preconditions | When the TPA is initiated from an ecommerce business web page, only the base product keys need to have been uploaded into the TPA. When the TPA is not initiated from an ecommerce business, the site id, locale, catalog id and the base product keys need to have been uploaded into the TPA. TPA has defined to it at least one valid and deployed base product key with tiered pricing. TPA has defined to it at least one valid base product key that has currently deployed variations with tiered pricing. TPA has defined to it at least one invalid base product key. TPA has defined to it at least one valid base product key with variations—none of which are currently deployed. |
| Minimal Guarantees | The Get Products request will be acknowledged by ecommerce business server. |
| Success Guarantees | For each product requested, if any key parameter is invalid or if the base product with no variations or the variations of the base product is not in a deployed state, an error code and no other details will be returned. For each product requested, if the key parameters are all valid, the product is a base product without variations and it is in a deployed state, the details for the base product will be returned. For each product requested, if the key parameters are all valid, the product is a base product with variations and one or more of the variations are in a deployed state, the details of all the variation products in the deployed state will be returned. |
| Trigger | Consumer chooses to view pricing for a quantity of a product defined to the TPA. |
| Basic Course of Events | 1. The TPA is initiated by the consumer from an ecommerce business webpage.<br>2. Passed to the TPA are the site id, locale and catalog id.<br>3. The consumer navigates to a page within the TPA that displays one or more valid and deployed base products without variations.<br>4. The TPA posts a single XML request to the Get Products API with a quantity of 1 for each of the base product keys defined for the products that are to be displayed.<br>5. The Get Products API returns an XML document with the product details and pricing for each of the valid and deployed base products.<br>6. The TPA displays the details and single unit pricing for each of the products returned to it from the Get Products API.<br>7. The consumer enters one or more quantities that will introduce a per unit price break and initiates an update of the page.<br>8. The TPA posts a single XML request to the Get Products API with user entered quantities for each of the base product keys defined for the products that are to be updated.<br>9. The Get Products API returns an XML document with the product details and discounted pricing for each of the valid and deployed base/variation products.<br>10. The TPA displays the details and discounted single unit pricing for each of the base/variation products.<br>11. End. |
| Extensions | A: 1. The TPA is initiated outside an ecommerce business web page.<br>    2. The TPA supplies the site id, locale and catalog id.<br>B: 3. The consumer navigates to a page within the TPA that displays one or more valid base products with deployed variations.<br>    5. The Get Products API returns an XML document with the product details and pricing for all the deployed variations of the base products with deployed variations.<br>C. 3. The consumer navigates to a page within the TPA that intends to display at least one product that is defined with an invalid base product key.<br>    5a. Within the XML document, for the invalid base product key, the Get Products API returns an error code and no additional details.<br>    6. End.<br>D. 3. The consumer navigates to a page within the TPA that intends to display at least one valid base product for which there is no deployed version.<br>    5a. Within the XML document, for the base product that has no deployed version, the Get Products API returns an error code and no additional details. |

TABLE 3-continued

Viewing Product Details & Tiered Pricing

| Information | Details |
|---|---|
| | 6. End. |
| | E. 3. The consumer navigates to a page within the TPA that intends to display the variations for at lease one valid base product key where none of the variations have been deployed. |
| | 5a. Within the XML document, for the base product that has no deployed variations, the Get Products API returns an error code and no additional details. |
| | 6. End. |

TABLE 4

Adding Products to Shopping Cart

| Information | Details |
|---|---|
| Summary | Using a third-part application (TPA), a consumer is able to add line-items. The TPA will add line-items to the DR shopping cart via the Add Line-Item API which in turn returns the full shopping cart back to the TPA. |
| Primary Actor(s) | Consumer; TPA; Add Line-Items API |
| Preconditions | Because of the Get Products API, the consumer will only be able to add valid and deployed products. |
| Minimal Guarantees | The Add Line-Item request will be acknowledged by ecommerce business server. |
| Success Guarantees | The products listed within the add line-items request will be added to ecommerce business shopping cart. The full shopping cart details are returned to the TPA. |
| Trigger | Consumer adds line-items to the TPAs shopping cart. |
| Basic Course of Events | 1. After viewing the details of one or more valid and deployed products within the TPA, the consumer enters quantities and selects the products to be added to the TPAs shopping cart.<br>2. The TPA posts a single XML request to the Add Line-Items API with the user entered quantities for each of the selected products.<br>3. The Add Line-Items API creates a new order if it doesn't already exist.<br>4. Including any discounts and/or tight/semi-tight marketing bundles, the Add Line-Items API adds the entered quantities of the selected products to the ecommerce business shopping cart.<br>5. An XML document including all the quantities of lines-items selected by the user, any tight/semi-tight bundles that apply and discounted pricing that applies is returned to the TPA.<br>6. The TPA displays the returned results within the TPA shopping cart.<br>7. End. |
| Extensions | None |

TABLE 5

Changing Shopping Cart Product Quantities

| Information | Details |
|---|---|
| Summary | Using a third-part application (TPA), a consumer is able to change product quantities and/or remove products. The TPA will update the ecommerce business shopping cart via the Update Line-Item Quantities API which returns the full shopping cart back to the TPA. |
| Primary Actor(s) | Consumer; TPA; Update Line-Item Quantities API |
| Preconditions | Consumer has added one or more items to the TPAs shopping cart. |
| Minimal Guarantees | The Update Product Quantities request will be acknowledged by ecommerce business's server. |
| Success Guarantees | Product quantity changes will be updated to the ecommerce business shopping cart. Product quantities equal to zero will be removed from the ecommerce business shopping cart. The full shopping cart details are returned to the TPA. |
| Trigger | Consumer changes the quantity for one or more products and/or requests one or more products be removed from the TPA shopping cart. |
| Basic Course of Events | 1. While viewing the TPAs shopping cart, the consumer changes the quantity of one or more products and requests one or more products be removed. |

TABLE 5-continued

Changing Shopping Cart Product Quantities

| Information | Details |
|---|---|
| | 2. The TPA posts a single XML request to the Update Line-Item Quantities API with the new quantity for each of the products for which a quantity was changed and a quantity of zero for each of the products the consumer requested be removed.<br>3. The Update Line-Item Quantities API updates the ecommerce business shopping cart as follows:<br>    a. Any products for which the quantity is zero will be removed.<br>    b. Any tight/semi-tight marketing bundles for removed products are also removed.<br>    c. Quantities are adjusted to reflect the consumer's latest entries.<br>    d. Any volume discounts will be adjusted based on the new quantities.<br>4. An XML document including all remaining quantities of lines-items, any tight/semi-tight bundles that still apply and any discount pricing that still applies is returned to the TPA.<br>5. The TPA displays the returned results within the TPA shopping cart.<br>6. End. |
| Extensions | None |

TABLE 6

Viewing Existing Cart

| Information | Details |
|---|---|
| Summary | Using a third-part application (TPA), a consumer is able to view the existing cart from within the TPA. The TPA will retrieve the current shopping cart via the Get Cart API which returns the full ecommerce business shopping cart back to the TPA. |
| Primary Actor(s) | Consumer; TPA; Get Cart API |
| Preconditions | None. |
| Minimal Guarantees | The Get Cart request will be acknowledged by ecommerce business's server. |
| Success Guarantees | The full shopping cart details are returned to the TPA. |
| Trigger | Consumer requests within the TPA to view the existing shopping cart. |
| Basic Course of Events | 1. From within the TPA, the consumer requests to view the existing shopping cart.<br>2. The TPA posts a single XML request to the Get Cart API with the visitor's session id.<br>3. The Get Cart API verifies the visitor's session id exists and retrieves the associated order details.<br>4. An XML document including all the quantities of lines-items selected by the user, any tight/semi-tight bundles that apply and discounted pricing that applies is returned to the TPA.<br>5. The TPA displays the returned results within the TPA shopping cart.<br>6. End. |
| Extensions | A. 3. The Get Cart API is not able to verify the visitor's session id and creates a new visitor session id.<br>    4. An XML document with the new session id and no cart details is returned to the TPA.<br>    5. End. |

TABLE 7

Checking Out

| Information | Details |
|---|---|
| Summary | After using a third-part application (TPA) to fill a shopping cart, the consumer clicks on the checkout button. The consumer will be redirected to the identically built ecommerce business shopping cart page. |
| Primary Actor(s) | Consumer; TPA |
| Preconditions | None. |
| Minimal Guarantees | The ecommerce business shopping cart page will be displayed. |
| Success Guarantees | The items within the ecommerce business shopping cart page are identical to those within the TPA's shopping cart. |

TABLE 7-continued

Checking Out

| Information | Details |
|---|---|
| Trigger | Consumer initiates checkout procedure. |
| Basic Course of Events | 1. From within the TPA, the consumer initiates the checkout procedure.<br>2. The TPA redirects the consumer to the ecommerce business shopping cart where the included items within the ecommerce business cart are identical to those within the TPA shopping cart.<br>3. End. |
| Extensions | None. |

Table 8 describes the XML schema for the various concrete classes.

Table 8—Message XML Schema and Other XSDs

The following provide examples of xml and xsd for some of the functions of the system. It will be appreciated by those skilled in the art that other xml code could be devised that performs the same functions without departing from the scope and spirit of the present invention.

An XML Schema Definition (XSD) is an instance of an XML schema written in the XML Schema language. An XSD defines a type of XML document in terms of constraints upon what elements and attributes may appear, their relationship to each other, what types of data may be in them, and other things. It can be used with validation software in order to ascertain whether a particular XML document is of that type, and to produce a Post-Schema Validation Infoset.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the web interface such that different dialog boxes are presented to a user that are organized or designed differently while maintaining substantially the same functionality without departing from the scope and spirit of the present invention.

What is claimed is:

1. A server side software system for managing an electronic commerce shopping cart web service which operates on an ecommerce business server, the electronic shopping cart web service interacts with a client hosted website over a communication network while a shopper interacts with the client hosted website over the communication network, the server side software system comprising:
a shopping cart application programming interface (API) configured to operate on the ecommerce business server configured to provide access through the electronic shopping cart web service to a website product catalog and shopping cart functions; and
a shopping cart module configured to operate on the client hosted website operatively configured to provide product selection and product details to the shopper based on continuously synchronized, real-time information retrieved from the integration service shopping cart API, the shopping cart module comprising a check out software component module configured for communication with the electronic shopping cart web service.

2. The server side software system of claim 1 wherein the API is operatively coupled to an XML product manager which enables client personnel to upload product details.

3. A method for managing an electronic commerce shopping cart web service operating on an ecommerce business server where the shopping cart web service interacts with a client hosted website over a communication network while a shopper interacts with the client hosted website over the communication network, the method comprising:
providing access through the electronic shopping cart web service to a website product catalog and shopping cart functions on the ecommerce business server by utilizing an integration service shopping cart application programming interface (API);
continuously synchronizing, through the communication network, real-time information retrieved from the integration service shopping cart API on the ecommerce business server with a shopping cart module hosted on the client hosted website so that the shopping cart module can provide product selection and product details to the shopper; and
communicating, through the communication network, shopping cart functionality to the client hosted website by utilizing the integration service shopping cart API so that the client website hosts a shopping cart while relying upon the ecommerce provider for shopping cart functionality.

4. The method of claim 3 wherein the API is operatively coupled to an XML product manager which enables client personnel to upload product details.

5. A server side software system for managing an electronic commerce shopping cart web service which operates on an ecommerce business server, the electronic shopping cart web service interacts with a client hosted website over a communication network while a shopper interacts with the client hosted website over the communication network, the server side software system comprising:
an integration service shopping cart application programming interface (API) configured to operate on the ecommerce business server configured to provide access through the electronic shopping cart web service to a website product catalog and shopping cart functions, wherein the API is operatively coupled to the XML product manager which enables client personnel to upload product details; and
a shopping cart module configured to operate on the client hosted website operatively configured to provide product selection and product details to the shopper based on continuously synchronized, real-time information retrieved from the integration service shopping cart API, the shopping cart module comprising a check out software component module configured for communication with the electronic shopping cart web service; and an XML product manager is operatively configured to work with the ecommerce business server to enable client personnel to upload product details, the XML product manager further configured to provide the shopping cart module on the client hosted website with an interface for retrieving products, product variations and quantity based pricing.

6. The server side software system of claim 5 wherein the shopping cart module comprises a flash application.

7. The server side software system of claim 5 further comprising a shopper-based application on a computing device associated with the shopper operatively coupled over the communication network to the shopping cart on the client hosted website and configured to enable the shopper to purchase a product through the shopping cart.

8. The server side software system of claim 5 wherein the integration service shopping cart API is operatively configured to pass at least one of a site identification (id) number, a locale, and a catalog id to the shopping cart module on the client hosted website whereby the site product catalog is updated.

9. The server side software system of claim 5 wherein the product details includes: whether the product is a base product, what product variation are available, and whether the product is for sale.

10. The server side software system of claim 5 wherein the checkout software component module is operatively coupled to the website product catalog such that the shopper can search for products and add the products to a host shopping cart whereby the shopper can proceed to checkout.

11. The server side software system of claim 5 wherein the shopping cart module on the client hosted website is operatively configured to post XML to an integration servlet such that the integration service shopping cart API works with a translator module and the integration servlet to map the shopping cart module's XML format.

12. The server side software system of claim 5 wherein the shopping cart module on the client hosted website further comprises an authorization module to update session token attributes such that repeated requests from a buyer operate on a correct user session and requisition.

13. A method for managing an electronic commerce shopping cart web service operating on an ecommerce business server where the shopping cart web service interacts with a client hosted website over a communication network while a shopper interacts with the client hosted website over the communication network, the method comprising:

continuously synchronizing, through the communication network, real-time information retrieved from the integration service shopping cart API on the ecommerce business server with a shopping cart module hosted on the client hosted website so that the shopping cart module can provide product selection and product details to the shopper; and communicating, through the communication network, shopping cart functionality to the client hosted website by utilizing the integration service shopping cart API so that the client website hosts a shopping cart while relying upon the ecommerce provider for shopping cart functionality; and providing access through the electronic shopping cart web service to a website product catalog and shopping cart functions on the ecommerce business server by utilizing an integration service shopping cart application programming interface (API), wherein the API is operatively coupled to an XML product manager operatively configured to work with the ecommerce business server to enable client personnel to upload product details and which provides a shopping cart module with an interface for retrieving products, product variations and quantity based pricing.

14. The method of claim 13 wherein the continuously synchronizing step further comprises utilizing a flash application.

15. The method of claim 13 wherein the providing step further comprises utilizing a shopper-based application on a computing device associated with the shopper operatively coupled over the communication network to the shopping cart on the client hosted website and configured to enable the shopper to purchase a product through the shopping cart.

16. The method of claim 15 wherein the providing step further comprises the shopper-based application being configured to enable the shopper to search for products in the website product catalog and add the products to the shopping cart whereby the shopper can proceed to checkout.

17. The method of claim 13 wherein the providing step further includes the integration service shopping cart API operatively configured to pass at least one of a site identification (id) number, a locale, and a catalog id to the shopping cart module on the client hosted website whereby the site product catalog is updated.

18. The method of claim 13 wherein the product details include: whether the product is a base product, what product variations are available, and whether the product is for sale.

19. The method of claim 13 further including a step of posting XML to an integration servlet such that the integration service shopping cart API works with a translator module and the integration servlet to map the shopping cart module's XML format.

20. The method of claim 13 wherein the client computer hosted shopping cart module further comprises an authorization module to update session token attributes such that repeated requests from a buyer operate on a correct user session and requisition.

* * * * *